United States Patent [19]

Sorrells

[11] Patent Number: 4,736,081
[45] Date of Patent: Apr. 5, 1988

[54] MECHANICALLY OPERATED ELECTRIC PULSE SWITCH AND ANTI-TIE DOWN CONTROL CIRCUIT USING THE SAME

[75] Inventor: Dwight W. Sorrells, Pine Level, N.C.

[73] Assignee: Eaton Corporation, Cleveland, Ohio

[21] Appl. No.: 877,086

[22] Filed: Jun. 23, 1986

[51] Int. Cl.⁴ .................... H01H 13/56; H01H 13/60
[52] U.S. Cl. .................... 200/160; 200/68.1;
   200/153 J; 200/6 BB; 200/159 A
[58] Field of Search .................... 200/314, 160, 153 J,
   200/68.1, 68.2, 159 A, 5 A, 6 B, 6 BB, 290,
   245-247, 67 D, 153 V

[56] References Cited

U.S. PATENT DOCUMENTS

| | | | |
|---|---|---|---|
| 1,569,416 | 1/1926 | Bates | 200/68.1 |
| 2,047,950 | 7/1936 | Douglas | 200/68.2 |
| 2,205,484 | 9/1942 | Krieger | 200/67 A |
| 2,405,679 | 8/1946 | Wahlstrom | 200/160 X |
| 2,576,771 | 11/1951 | Bentley | 200/153 J X |
| 3,183,333 | 5/1965 | Goldbeck | 200/151 R |
| 3,213,229 | 10/1965 | Carlson et al. | 200/68.1 |
| 3,274,354 | 9/1966 | Stevens | 200/76 |
| 3,378,664 | 4/1968 | Russenberger | 200/160 |
| 3,567,888 | 3/1971 | Long | 200/160 |
| 3,619,528 | 11/1971 | Sorenson | 200/153 J |
| 3,789,173 | 1/1974 | Bury | 200/153 J |
| 3,902,033 | 8/1975 | Jones | 200/160 |
| 4,081,632 | 3/1978 | Schaffeler | 200/6 BB |
| 4,095,070 | 6/1978 | Simpson | 200/153 J |
| 4,300,026 | 11/1981 | Bull | 200/153 J |
| 4,357,511 | 11/1982 | Tenner et al. | 200/314 |
| 4,473,728 | 9/1984 | Sketch | 200/68.2 |
| 4,562,818 | 12/1985 | Sorenson | 200/73 |

FOREIGN PATENT DOCUMENTS

| | | | |
|---|---|---|---|
| 10835 | 10/1956 | Fed. Rep. of Germany | 200/153 J |
| 2202677 | 8/1972 | Fed. Rep. of Germany | 200/153 J |
| 3538380 | 4/1986 | Fed. Rep. of Germany | 200/160 |
| 822196 | 10/1956 | United Kingdom | 200/153 J |
| 995378 | 6/1965 | United Kingdom | 200/314 |

Primary Examiner—Henry J. Recla
Assistant Examiner—Ernest G. Cusick
Attorney, Agent, or Firm—D. A. Rowe; L. G. Vande Zande

[57] ABSTRACT

An alternate or push-push switch mechanism effects movement of a contact actuator (28) from one stable position to another stable position upon a single depression of a pushbutton operator (34,38,40,42,44). Actuator movement causes a spring loaded plunger (28a) to traverse a surface of a normally open contactor (54) to effect momentary contact closure with a stationary contact (46a) during the movement of the actuator and plunger. The duration of contact closure may be controlled or modified by providing a cam on the contactor surface for engagement by the plunger. Two such switches (20a,20b) are employed in series in a control circuit for a manufacturing machine (M) whereby both switches must be operated by a human operator of the machine within the closure duration interval of the contacts of the individual switches to complete the control circuit for the machine.

15 Claims, 1 Drawing Sheet

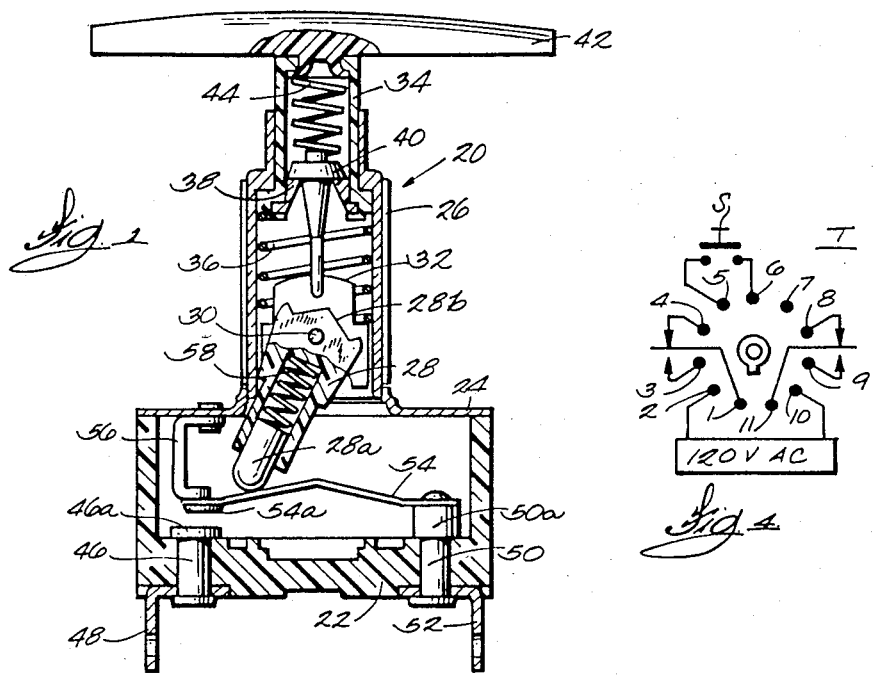
Fig. 1
Fig. 4
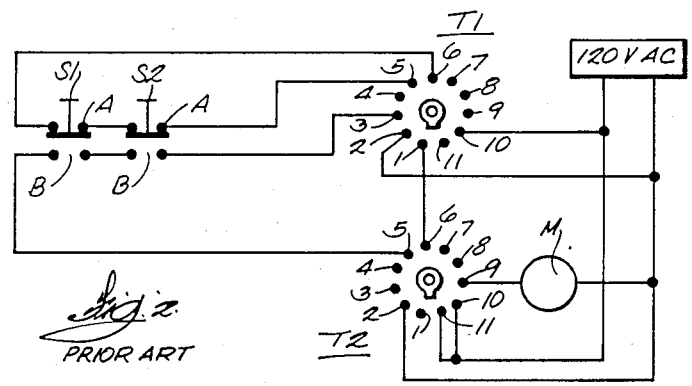
Fig. 2
PRIOR ART
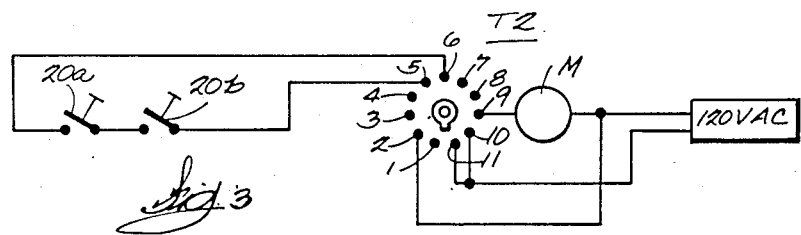
Fig. 3

MECHANICALLY OPERATED ELECTRIC PULSE SWITCH AND ANTI-TIE DOWN CONTROL CIRCUIT USING THE SAME

BACKGROUND OF THE INVENTION

This invention relates to mechanically operated electric switches, particularly of the pushbutton operator type, which effect a momentary closing and reopening of a normally open pair of switch contacts during a single operation of the switch. Switches of this type may be referred to as single stroke make and break pushbuttons. More specifically, this invention relates to switches of the aforementioned type which are further categorized as palm switches which have utilization in anti-tie down control circuits for electrically controlled manufacturing apparatus which require the human operator of the apparatus to operate two spaced apart palm switches simultaneously to cycle the apparatus. This invention further relates to an anti-tie down control circuit of the aforementioned type utilizing the switches of this invention.

Manufacturing apparatus such as punches, presses, forming brakes, riveters and the like, require a human operator to position a work piece within the apparatus and to then operate one or more switches which will cause the apparatus to cycle driving a tool member down upon the work piece. For safety reasons, to insure that the human operator's hands are clear of the area of the work piece and tool at the time of impact, control systems for the apparatus commonly employ two spaced apart hand operated switches in the control circuit, each which must be operated to close its respective contacts during the same time interval to effect cycling of the apparatus. In order to increase production, human operators often defeat this safety feature by securing one of the hand operated switches in the contact closed position. As a result, manufacturers of the apparatus and the control systems therefor have devised more complex systems which are not susceptible to defeating the aforementioned safety feature. Such systems are referred to as anti-tie down systems and include additional control elements therein such as timing relays or the like which add to the initial cost and subsequent maintenance of the system and to the overall labor burden of the parts being manufactured

SUMMARY OF THE INVENTION

This invention provides a mechanically operated electric pulse switch which closes a normally open pair of contacts momentarily during depression of the pushbutton operator and releases the contacts to return to the normally open condition during the same depression operation of the pushbutton independently of any maintained status of the pushbutton. The invention also provides for connecting the contacts of a pair of the aforementioned switches in series in an electrical control circuit for manufacturing apparatus whereby the two switches must be operated substantially simultaneously in order to close the circuit to the apparatus.

These and other features of the invention will become apparent when reading the following specification and claims in conjunction with the accompanying drawings.

BRIEF DESCRIPTION OF THE DRAWINGS

FIG. 1 is a cross sectional view of a pushbutton switch constructed in accordance with this invention;

FIG. 2 is a schematic diagram of a prior art control system for manufacturing apparatus;

FIG. 3 is a control system constructed in accordance with this invention for the manufacturing apparatus such as that of FIG. 2; and FIG. 4 is a schematic diagram of a timer employed in the control systems of FIGS. 2 and 3.

DESCRIPTION OF THE PREFERRED EMBODIMENTS

The mechanically operated electric pulse switch of this invention is shown at 20 in FIG. 1. The switch comprises a molded insulating base 22, a metal frame 24 covering an open side of the base 22 and secured to the base by suitable fastening means (not shown), a threaded bushing 26 attached to the frame 24, an actuator 28 pivotally mounted within the lower end of bushing 26 upon a pivot pin 30 extending through the bushing, a pair of spring seats 32 (only one of which is shown) located within the bushing on opposite sides of the actuator 28, a pushbutton sleeve 34 located and guided for reciprocal movement within the open upper end of bushing 26, a helical compression spring 36 positioned within bushing 26 to bear between spring seats 32 and pushbutton sleeve 34, a cup washer 38 securily affixed within the lower end of sleeve 34 as by spinning or clinching over the lower end of sleeve 34, a plunger 40 positioned upon the inner surface of cup washer 38, an enlarged pushbutton operator head 42 riveted to the upper end of sleeve 34, and a helical compression spring 44 disposed within the sleeve 34 between the rivet portion of pushbutton operator head 42 and the plunger 40. Insofar as described hereinabove, the switch is very similar to the push-push oprating mechanism for electric switches described and claimed in A. W. Krieger U.S. Pat. No. 2,295,484 issued Sept. 8, 1942, the disclosure of which is incorporated herein by reference. The lower part of the actuator 28 and the contact structure of switch 20 differ from that disclosed in the aforementioned patent.

A rivet 46 is positioned within a hole in the bottom wall of base 22 at the left-hand side thereof as viewed in FIG. 1 to project outwardly of the base through an aligned hole in a wiring terminal member 48. The lower end of rivet 46 is deformed over the outer surface of terminal 48 to securely affix the rivet 46 and terminal 48 to the base 22. The interior head portion 46a of rivet 46 serves as a stationary contact for the switch. A similar rivet 50 is positioned through a hole in the bottom wall of base 22 at the right-hand side thereof as viewed in FIG. 1, the outer end of rivet 50 extending through an aligned hole in a terminal 52 and is deformed to securely affix the rivet 50 and terminal 52 to the base 22. The interior head portion 50a of rivet 50 is substantially higher than the head 46a of rivet 46 and has a leaf spring movable contactor 54 riveted to the upper surface thereof. Contactor 54 extends leftwardly in a cantilever fashion to overlie the stationary contact 46a. A contact element 54a is affixed to the underside of the left-hand end of contactor 54 for engagement with stationary contact 46a. The leaf spring contactor member 54 is provided with an integral bias to urge the contactor 54 and movable contact element 54a away from the stationary contact 46a. A C-shaped insulating stop member 56 is secured to the underside of frame 24 by riveting or the like to extend downwardly within the cavity of switch base 22 to serve as an upper limit stop for the left-hand end of contactor 54. Contactor 54 is formed to have a shallow V-shaped bend intermediate its left- and right-hand ends, the apex of which is directed upwardly toward the actuator 28. The latter has a cylindrical aperature open to the bottom thereof in which is contained a slidable plunger 28a biased outwardly into engagement with the contactor 54 by a helical compression spring 58.

The operation of switch 20 will now be described. As seen in FIG. 1, the upper end 286 actuator 28 is formed with a W-cam shape above the pivot pin 30, the central apex of the W-cam surface being disposed to one side of the vertical plane through pivot 30 when the actuator 28 is in the stable position as shown in FIG. 1 or the opposite right stable position. Manual depression of pushbutton 42 and sleeve 34 against the bias of compression spring 36 causes the lower end of plunger 40 to engage the left-hand portion of the W-cam surface. Spring 44 is formed to have sufficient spring force to permit tilting deflection of the lower end of plunger 40 to the left as the pushbutton 42 is moved downward until the lower end of plunger 40 seats within the root of the left-hand portion, of the W-cam without permitting the plunger to raise significantly from the cup washer 38. Continued depression of pushbutton 42 then causes plunger 40 to rotate actuator 28 counterclockwise about pivot 30, moving the actuator from its left-hand stable position as shown in the drawings to a similar but opposite right-hand stable position. Such movement causes the plunger 28a to traverse the surface of contactor 54, urging contactor 54 downwardly whereby contact 54a is driven into momentary engagement with stationary contact 46a, such engagement occurring by example at the time when plunger 28a engages the apex of contactor 54. The movement of actuator 28 is of the overcenter snap action type and occurs relatively rapidly. The duration of closure of the contacts 54a and 46a may be controlled by changing the contour of the apex or cam surface of the contactor 54, either making it more abrupt to shorten the duration or forming it with a more gentle contour to increase the duration of contact closure. The movement of actuator 28 from the left-hand stable position to the right-hand stable position occurs at the end of the depression stroke of the pushbutton 42 independently of release of the pushbutton. Moreover, the contacts 54a–46a close and reopen during the movement of actuator 28 and neither the reopening nor the duration of their closure is controlled in any way by maintaining the pushbutton depressed.

Switch 20 is shown and described in the preferred embodiment herein as a single pole switch, although it is to be understood that it is readily susceptible to be constructed as a double pole switch. The movable contactor 54, while shown as a flexible leaf spring, could be a rigid current carrying member biased upwardly by a compression spring operating against the bottom of the base and having a suitably shaped cam formed on the upper surface thereof for engagement by the contactor. It is also contemplated that the upper surface of the contactor need not include a cam if the spacing between the movable and stationary contacts in the open position is such that movement of the actuator plunger 28a over center will provide sufficient vertical depression of the movable contactor. The switch can also be made a double throw switch by substituting a second stationary contact for the upper limit stop 56 in a manner well known to those skilled in the art.

The switch of this invention finds particular application in an anti-tie down control circuit for controlling an electrically operated machine such as a punch press, shear, forming brake, riveter and the like wherein a workpiece is inserted manually by a human operator into the machine and the machine is then cycled by the human operator to drive a tool into engagement with the work piece for accomplishing the desired work result. FIG. 2 shows a prior art anti-tie down control circuit for such apparatus wherein two pushbutton switches are required to be operated each time the machine is to be cycled and both must be closed within a particular predetermined timed interval. The machine, when cycled, preferably maintains the tool in contact with the work piece for a predetermined timed interval to insure that the operation has been performed satisfactorily to provide proper integrity and quality of the product. To this end, a pair of identical off delay timed relays are utilized in the system. A switching schematic of the timers T1 and T2 of FIG. 2 is shown at T in FIG. 4. The timer may preferably be of the type manufactured by Cramer Co., Old Saybrook, Conn. under the description Solid State Plug-in Timer, 392 Series Off Delay Model, Type 20011 having an adjustment range of 0.1–10 seconds. As shown in FIG. 4, terminals 2 and 10 of the timer T are connected to a 120 volt AC supply. Terminals 5 and 6 of the timer T are connected to a pilot control circuit which includes a pushbutton switch S. Terminals 1 and 11 are connected to a common side of the switching circuit of the timer relay which has a normally closed condition to termials 4 and 8, respectively. A normally open switching condition exists between terminals 1 and 3, 11 and 9 respectively. Thus the timer relay T is a double pole, double throw device. Closure of switch S completes a circuit to terminals 5 and 6 to energize the timer relay, causing the relay to switch open between terminals 1 and 4 and 11 and 8, and to complete a circuit between terminals 1 and 3 and 11 and 9, respectively. When the switch S is reopened, the timer relay is deenergized and a timed period is intiated during which the circuit between terminals 1 and 3 and 11 and 9 remain completed. At the end of the timed interval, the relay switcn s to open the circuits between terminals 1 and 3 and 11 and 9, respectively and to reclose the circuits between terminals 1 and 4 and 11 and 8, respectively.

In the prior art control system shown in FIG. 2, a first timer T1 has its terminals 2 and 10 connected to a 120 volt AC supply. A pair of double throw pushbutton switches S1 and S2 have their normally closed contacts A connected in series to the control terminals 5 and 6 of timer T1 to thereby energize the timer, completing a switching circuit between the terminals 1 and 3 thereof. The normally open contacts B of switches S1 and S2 are series connected to the terminal 3 of timer T1 and to the terminal 5 of a second timer T2 which also has its terminals 2 and 10 connected to the 120 volt AC supply. Control terminal 6 of timer T2 is connected to switching terminal 1 of timer T1. Switching terminals 11 and 9 of timer T2 are connected through the machine M to the 120 volt AC supply. In operation, the human operator for the machine can cycle the machine by depressing the pushbuttons S1 and S2 to open the contacts A, thereby deenergizing timer T1 to initiate the timed interval for causing the contacts of timer T1 to switch. That timed interval is preferably 0.5 seconds and within that interval the human operator must depress both switches S1 and S2 sufficiently to close the normally open contacts B thereof at the same time to complete the circuit through the terminals 1 and 3 of timer T1 to the control terminals 5–6 of timer T2. When that circuit is completed, timer T2 is energized to cause it to switch, completing a circuit from its terminals 11 and 9 through the machine M to connect the machine to the AC power and causing the machine to cycle. Timed opening of the circuit between terminals 1 and 3 of timer T1 deenergizes timer T2 to initiate the timed interval of that timer, again preferably 0.5 seconds, whereby the machine M is held energized for the timed interval to insure good quality operation of the work cycle.

A control system for the same machine M is shown in FIG. 3 wherein the mechanically operated electric pulse switch of this invention is utilized. By employing two such switches 20a and 20b in the control circuit of the timer T2 of FIG. 3, the timer T1 may be eliminated, thereby reducing the initial cost of the control system and reducing the attendant maintenance cost throughout the life of the machine. Timer T2 and the machine M are connectd to the 120 volt source in the same manner as that shown in FIG. 2. The switches 20a and 20b are connected in series to the control terminals 5 and 6 of timer T2. Inasmuch as the contacts of switch 20 of this invention are closed only for a brief duration and subsequently released to the normally open condition all upon the depression stroke of the pushbutton operator, both switches 20a and 20b must be depressed essentially simultaneously to cause closure of the contacts of both switches within the duration of contact closure of either switch. When the switches 20a and 20b are so operated, a circuit is completed to termials 5 and 6 of timer T2 to energize the timer, causing it to switch and complete a circuit through its terminals 11 and 9 to connect the machine M to the 120 volt source. Opening of the contacts of switches 20a and 20b deenergizes timer T2 to initiate the timed interval for maintaining the machine M cycled to achieve the desired product integrity and quality control of the operation as aforedescribed.

It will be appreciated from the foregoing that the mechanically operated electric pulse switch of this invention provides a simple and reliable means of momentary closure for switch contacts such as to deliver an electrical pulse through the switch contacts and that the same may be readily and economically manufactured. Moreover, the switch provides a significant economic advantage when used in the control circuit of a manufacturing machine requiring an anti-tie down feature between a pair of palm button switches, each of which are required to be operated substantially simultaneously by a human operator for safety reasons. While the switch and the control system in which it is advantageously used have been described in preferred embodiments herein, it is to be understood that each are susceptible of various modifications without departing from the scope of the appended claims.

I claim:

1. A mechanically operated electric pulse switch comprising, in combination:
   a housing having an opening;
   a stationary contact mounted in said housing;
   movable contact means mounted in said housing for movement into engagement with said stationary contact, said movable contact means being biased to a normally open position spaced from said stationary contact;
   an alternate-action actuator rotatably mounted in said housing for rotary movement between a pair of stable extreme positions thereof, said actuator having a plunger biased into engagement with said movable contact means;
   pushbutton operator means mounted in said housing and extending through said opening in said housing externally thereof movable between an extended position and a depressed position;
   means biasing said operator means to said extended position with respect to said housing;
   movement of said operator means against said biasing means to said depressed position effecting rotary movement of said actuator from one said stable extreme position to the other, said rotary movement causing said plunger to traverse said movable contact means momentarily closing and re-opening said movable contact means upon said stationary contact during said actuator movement.

2. The invention defined in claim 1 wherein said biased engagement of said plunger with said movable contact means biases said actuator to said one or said other of said pair of stable extreme positions.

3. The invention defined in claim 2 wherein said operator means moves said actuator from said one stable extreme position to and beyond a center position and said biased engagement of said plunger with said movable contact means moves said actuator to said other stable extreme position while said operator means remains in said depressed position.

4. The invention defined in claim 3 wherein said movable contact means comprises a member supported at one end and overlying said stationary contact at an opposite end thereof.

5. The invention defined in claim 4 wherein said movable contact means includes a surface continuously engaged by said plunger when said actuator is in either of said stable extreme positions and during movement of said actuator between said stable extreme positions.

6. The invention defined in claim 5 wherein engagement of said plunger with said movable contact surface in either of said stable extreme positions does not cause closing engagement of said movable contact means upon said stationary contact.

7. The invention defined in claim 6 wherein said surface comprises cam means projecting toward said plunger means for engagement thereby during said actuator movement.

8. The invention defined in claim 7 wherein said movable contact means comprises a leaf spring fixed at one end and overlying said stationary contact at an opposite end thereof.

9. The invention defined in claim 8 wherein said leaf spring comprises an integral bias away from said stationary contact.

10. The invention defined in claim 9 wherein said leaf spring comprises a shallow V-shaped member, the apex of which is directed toward said plunger for comprising said cam means.

11. The invention defined in claim 7 wherein said movable contact means engages said stationary contact when said plunger traverses a high point of said cam means, said engagement of said movable contact means and said stationary contact being for a duration determined by the shape of said cam means.

12. The invention defined in claim 1 wherein said operator means engages said actuator upon depression thereof for effecting said rotary movement from said one stable extreme positon to the other and disengages from said actuator upon movement to said extended position.

13. In an anti-tie down control circuit for energizing electrical apparatus for a single operational cycle of said apparatus each time said control circuit is operated, a pair of mechanically operated pulse switches having their respective contacts connected in series in said control circuit, each said switch having a pushbutton operator providing closure and reopening of the respective switch contacts upon a single depression of a respective said pushbutton operator, said closure having a duration which is independent of operation of said pushbutton operator, said switches requiring substantially simultaneous depression of said pushbutton operators for operation of said control circuit, said switches each comprising:
  a stationary contact;
  movable contact means biased away from said stationary contact;
  a contact actuator movable between two stable positions thereof in response to depression of said pushbutton operator, subsequent depressions of said pushbutton operator effecting movement of said actuator in alternate directions; and
  means on said actuator engaging said movable contact means for effecting momentary closure of said movable contact means upon said stationary contact during movement of said actuator from one stable position to the other.

14. The invention defined in claim 13 wherein said movable contact means comprises cam means projecting toward said actuator for engagement thereby for effecting said momentary closure upon said stationary contact.

15. A mechanically operated electric pulse switch comprising, in combination:
  a pushbutton operator;
  a stationary contact;
  a movable contact biased away from said stationary contact;
  a contact actuator movable between two stable extreme positions thereof in response to depression of said pushbutton operator, subsequent depressions of said pushbutton operator effecting movement of said actuator in alternate directions;
  means on said actuator engaging said movable contact for effecting momentary closure of said movable contact upon said stationary contact and reopening of said movable and stationary contacts during movement of said actuator from one stable position to the other, closure and reopening of said movable and stationary contacts occurring during a single depression movement of said pushbutton operator.

* * * * *